Patented Oct. 5, 1926.

1,601,954

UNITED STATES PATENT OFFICE.

FREDERICK W. FREISE, OF PALMYRA, NEW JERSEY, ASSIGNOR TO AMERICAN CYANAMID COMPANY, OF NEW YORK, N. Y., A CORPORATION OF MAINE.

FERTILIZER COMPOSITION.

No Drawing. Application filed July 23, 1923. Serial No. 653,380.

The invention relates to a method of making a fertilizer material containing both nitrogen and phosphoric acid, in a simple and inexpensive manner. It also discloses a process of handling a maximum tonnage with the usual equipment of a fertilizer plant, without requiring an unusual amount of labor.

The object of this invention is to produce a dry granular material that will retain its fertilizing value in storage, and will meet all the requirements of a good commercial product. With these and other objects in view, the invention consists in the novel steps and combination of steps constituting the process, and in the novel product, all as will be more fully hereinafter described and particularly pointed out in the claims.

To clearly explain the method and describe the product, the following example is given. The operation is carried out in a mixing pan of the type usually employed and well known to fertilizer manufacturers. The amount added in each charge depends on the capacity of the acidulating pan, and it is to be understood that the amounts mentioned below refer solely to the relative proportions of the constituents of the charge. The materials employed are 1900 parts by weight of 52° Bé. sulphuric acid, 1000 parts by weight of finely ground phosphate rock and 200 parts by weight of crude nitrogenous material such as hair, feathers, leather scrap, wool waste, garbage, etc., which may be termed "industrial waste," and 500 parts by weight of calcium cyanamid.

The acid is first run into the mixing pan and the crude nitrogenous material is added to it. In from two to three minutes it is completely hydrolized, and the rock dust is added. This requires about the same length of time to be acted upon. The calcium cyanamid is next dumped in, and the pan treatment is finished. The last step consists in discharging the thick hot sludge into the den to solidify. When the mass sets up and the preliminary hardening is over, it is broken and piled in heaps to cure, forming a dry, granular product.

There are very many advantages of employing the above process. It enables one to build up a high grade fertilizer in one operation, and to turn out a large tonnage, with a relatively small amount of equipment, and gives a product that may be converted into a complete balanced fertilizer by the simple addition of a potash salt.

An advantage in this process that would not occur to one from a cursory examination, is its great flexibility. A fertilizer material of almost any desired analysis may be built up by suitably varying the proportions of the four materials in the acidulating pan. It will be readily seen by any one that the possible combinations of the four materials are almost unlimited. The remarkable properties of calcium cyanamid both as a source of nitrogen and as a conditioning agent, lends additional scope to the process.

It is obvious that those skilled in the art may vary the details of the process and the nature of the product without departing from spirit of the invention. Therefore, I do not wish to be limited to the above disclosures except as may be required by the claims.

I claim:

1. A method of making a fertilizer material containing nitrogen and phosphoric acid which comprises mixing crude nitrogenous material with sulphuric acid and adding phosphate rock and calcium cyanamid; substantially as described.

2. A method of making a fertilizer material containing nitrogen and phosphoric acid, which comprises adding crude nitrogenous material to sulphuric acid, as soon as the material has reacted adding phosphate rock, as soon as this has reacted adding calcium cyanamid, and allowing the mass to set in the den; substantially as described.

3. A method of making a fertilizer material containing nitrogen and phosphoric acid, which comprises running into a mixing tank about 1900 parts by weight of 52° Bé. sulphuric acid and adding about 200 parts of crude nitrogenous industrial waste material, allowing this to react from two to three minutes, adding 1000 parts of ground phosphate rock; allowing this to react for about two to three minutes, adding 500 parts calcium cyanamid, and agitating during the entire operation, discharging the sludge into a den, and when the preliminary setting is complete breaking up the mass and depositing it in heaps to cure; substantially as described.

4. A method of making a fertilizer material containing varying amounts of phosphoric acid and nitrogen which comprises providing a mixture of phosphate rock, sulphuric acid and crude nitrogenous materials in the acidulating pan and adding sufficient calcium cyanamid to get a dry, granular product; substantially as described.

5. As a new product a fertilizer material comprising an ammoniated base, acid phosphate, and calcium cyanamid; substantially as described.

6. As a new product a fertilizer comprising a material resulting from the interaction of nitrogenous organic material, ground phosphate rock and calcium cyanamid with sulphuric acid; substantially as described.

7. As a new product a fertilizer material in the form of a dry, granular powder and comprising an ammoniated base resulting from the decomposition of nitrogenous industrial waste material, ground phosphate rock and calcium cyanamid, all the above having interacted in the presence of and with sulphuric acid; substantially as described.

FREDERICK W. FREISE.